(12) United States Patent
Boyle

(10) Patent No.: US 8,788,778 B1
(45) Date of Patent: Jul. 22, 2014

(54) GARBAGE COLLECTION BASED ON THE INACTIVITY LEVEL OF STORED DATA

(75) Inventor: William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 206 days.

(21) Appl. No.: 13/488,249

(22) Filed: Jun. 4, 2012

(51) Int. Cl.
*G06F 12/12* (2006.01)
*G06F 12/02* (2006.01)
*G06F 3/06* (2006.01)

(52) U.S. Cl.
CPC .......... *G06F 12/0253* (2013.01); *G06F 3/0647* (2013.01)
USPC .......................................... 711/165; 711/155

(58) Field of Classification Search
CPC ............................ G06F 3/0647; G06F 12/0253
USPC .................................. 711/165, 155; 707/813
See application file for complete search history.

(56) References Cited

U.S. PATENT DOCUMENTS

| | | | |
|---|---|---|---|
| 5,530,850 A | 6/1996 | Ford et al. | |
| 5,551,003 A | 8/1996 | Mattson et al. | |
| 5,604,902 A | 2/1997 | Burkes et al. | |
| 5,734,861 A | 3/1998 | Cohn et al. | |
| 5,799,185 A | 8/1998 | Watanabe | |
| 5,819,290 A | 10/1998 | Fujita | |
| 5,819,310 A | 10/1998 | Vishlitzky et al. | |
| 6,067,199 A | 5/2000 | Blumenau | |
| 6,125,434 A | 9/2000 | Willard et al. | |
| 6,324,631 B1 | 11/2001 | Kuiper | |
| 6,430,663 B1 | 8/2002 | Ding | |
| 6,493,160 B1 | 12/2002 | Schreck | |
| 6,711,660 B1 | 3/2004 | Milne et al. | |
| 6,854,022 B1 | 2/2005 | Thelin | |
| 6,978,283 B1 | 12/2005 | Edwards et al. | |
| 7,124,272 B1 | 10/2006 | Kennedy et al. | |
| 7,146,525 B2 | 12/2006 | Han et al. | |
| 7,149,822 B2 | 12/2006 | Edanami | |
| 7,315,917 B2 | 1/2008 | Bennett et al. | |
| 7,363,421 B2 | 4/2008 | Di Sena et al. | |
| 7,373,477 B2 | 5/2008 | Takase et al. | |
| 7,409,522 B1 | 8/2008 | Fair et al. | |
| 7,424,498 B1 | 9/2008 | Patterson | |
| 7,443,625 B2 | 10/2008 | Hamaguchi et al. | |
| 7,447,836 B2 | 11/2008 | Zhang et al. | |
| 7,516,355 B2 | 4/2009 | Noya et al. | |
| 7,519,639 B2 | 4/2009 | Bacon et al. | |
| 7,552,282 B1 | 6/2009 | Bermingham et al. | |
| 7,567,995 B2 | 7/2009 | Maynard et al. | |
| 7,593,975 B2 | 9/2009 | Edwards et al. | |
| RE41,011 E | 11/2009 | Han et al. | |
| 7,624,137 B2 | 11/2009 | Bacon et al. | |
| 7,685,360 B1 | 3/2010 | Brunnett et al. | |
| 7,707,166 B1 | 4/2010 | Patterson | |

(Continued)

FOREIGN PATENT DOCUMENTS

WO 9910812 A1 3/1999

*Primary Examiner* — Than Nguyen

(57) ABSTRACT

A data storage system implements garbage collection based on the inactivity level of stored data. In one embodiment, the inactivity level of data stored in regions of a data storage system is taken into account when prioritizing regions for garbage collection. Inactivity level of memory regions can be compared to an inactivity threshold. The threshold can be adjusted during operation of the data storage system. Garbage collection can be delayed until data stored in a particular region is unlikely to be updated. Write amplification associated with garbage collection is reduced, and improved performance is attained.

24 Claims, 6 Drawing Sheets

(56) References Cited

U.S. PATENT DOCUMENTS

| | | |
|---|---|---|
| 7,721,059 B2 | 5/2010 | Mylly et al. |
| 7,783,682 B1 | 8/2010 | Patterson |
| 8,359,430 B1 | 1/2013 | Fair |
| 8,521,972 B1 | 8/2013 | Boyle et al. |
| 2002/0138694 A1 | 9/2002 | Isshiki |
| 2002/0188800 A1 | 12/2002 | Tomaszewski et al. |
| 2003/0051110 A1 | 3/2003 | Gaspard et al. |
| 2003/0101383 A1 | 5/2003 | Carlson |
| 2004/0179386 A1 | 9/2004 | Jun |
| 2004/0268079 A1 | 12/2004 | Riedle et al. |
| 2005/0021900 A1 | 1/2005 | Okuyama et al. |
| 2005/0071537 A1 | 3/2005 | New et al. |
| 2005/0216657 A1 | 9/2005 | Forrer, Jr. et al. |
| 2006/0020849 A1 | 1/2006 | Kim |
| 2006/0106981 A1 | 5/2006 | Khurshudov et al. |
| 2006/0155917 A1 | 7/2006 | Di Sena et al. |
| 2006/0212674 A1 | 9/2006 | Chung et al. |
| 2007/0027940 A1 | 2/2007 | Lutz et al. |
| 2007/0050390 A1 | 3/2007 | Maynard et al. |
| 2007/0198614 A1 | 8/2007 | Zhang et al. |
| 2007/0208790 A1 | 9/2007 | Reuter et al. |
| 2008/0077762 A1 | 3/2008 | Scott et al. |
| 2008/0091872 A1 | 4/2008 | Bennett et al. |
| 2008/0263059 A1 | 10/2008 | Coca et al. |
| 2008/0263305 A1 | 10/2008 | Shu et al. |
| 2009/0049238 A1 | 2/2009 | Zhang et al. |
| 2009/0055450 A1 | 2/2009 | Biller |
| 2009/0094299 A1 | 4/2009 | Kim et al. |
| 2009/0164742 A1 | 6/2009 | Wach et al. |
| 2010/0153347 A1 | 6/2010 | Koester et al. |
| 2010/0287217 A1 | 11/2010 | Borchers et al. |
| 2010/0293354 A1 | 11/2010 | Perez et al. |
| 2011/0231623 A1 | 9/2011 | Goss et al. |
| 2011/0271037 A1* | 11/2011 | Oh et al. ............ 711/103 |
| 2011/0283049 A1 | 11/2011 | Kang et al. |
| 2012/0066438 A1* | 3/2012 | Yoon et al. ............ 711/103 |
| 2012/0096217 A1* | 4/2012 | Son et al. ............ 711/103 |
| 2012/0117322 A1 | 5/2012 | Satran et al. |
| 2012/0173832 A1 | 7/2012 | Post et al. |
| 2013/0107391 A1 | 5/2013 | Springberg et al. |

* cited by examiner

GARBAGE COLLECTION BASED ON THE INACTIVITY LEVEL OF STORED DATA

BACKGROUND

1. Technical Field

This disclosure relates to data storage systems for computer systems. More particularly, the disclosure relates to garbage collection based on the inactivity level of stored data.

2. Description of the Related Art

Data storage systems execute many housekeeping operations in the course of their normal operation. For example, garbage collection is frequently performed on memory regions that may contain both valid and invalid data. When such a region is selected for garbage collection, the garbage collection operation copies valid data within the memory region to new location(s) in memory and then erases or frees the entire region, thereby making the region available for future storage of data. However, performing garbage collection involves substantial overhead, such as increased write amplification in cases when solid state memory is used for storing data. Accordingly, it is desirable to provide more efficient garbage collection mechanisms.

BRIEF DESCRIPTION OF THE DRAWINGS

Systems and methods that embody the various features of the invention will now be described with reference to the following drawings, in which.

DETAILED DESCRIPTION

Figure 1A:
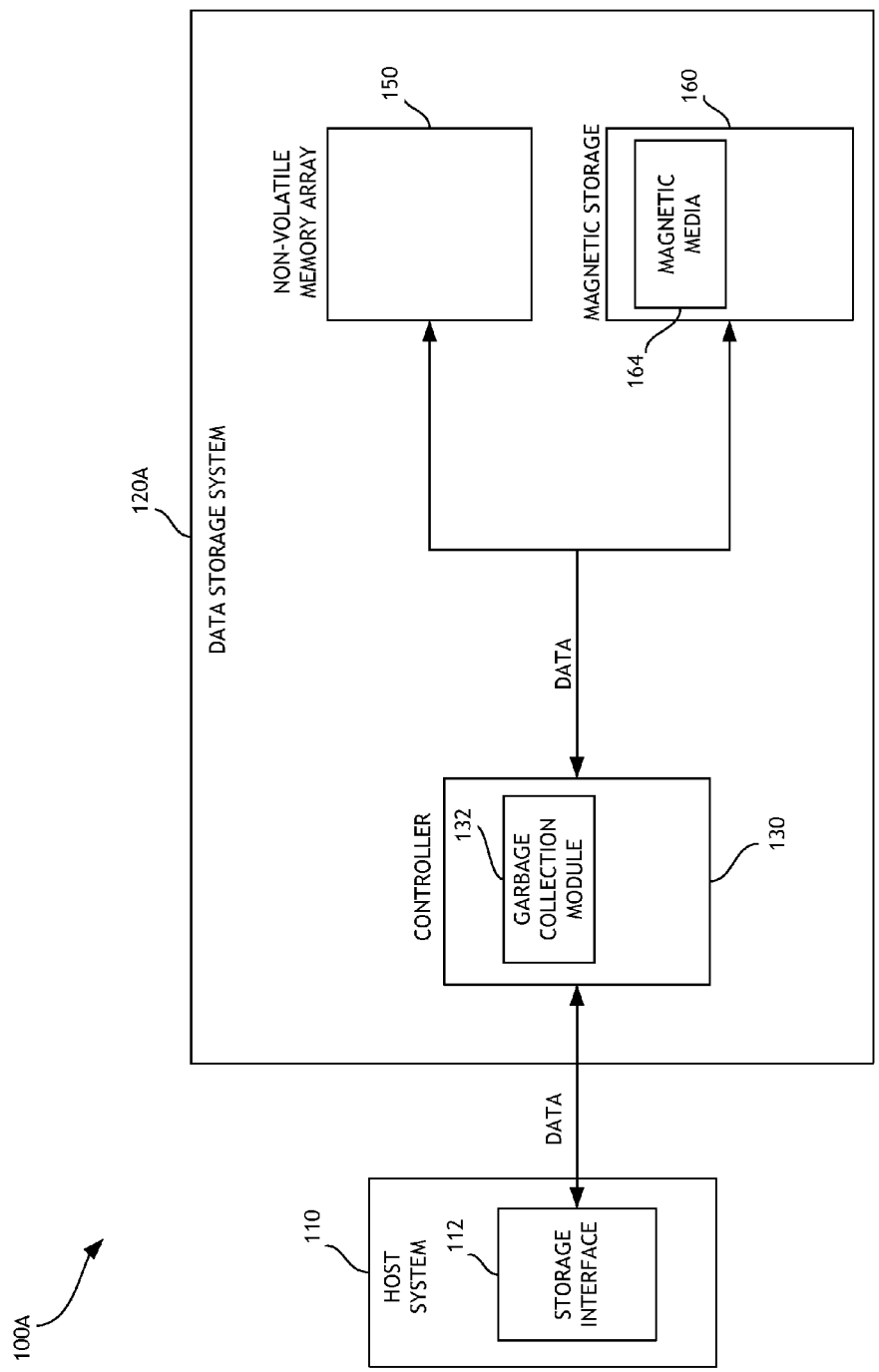
FIG. 1A illustrates a combination of a host system and a data storage system that implements garbage collection based on the inactivity level of stored data according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems perform internal system operations, such as garbage collection, to improve performance and longevity. Garbage collection can involve copying valid data stored in a memory region to another memory region, and further indicating that the former memory region no longer stores any valid data. For prioritizing, garbage collection can utilize the amount of invalid data remaining in the memory regions to be garbage collected. However, garbage collection operation involves considerable overhead, and prioritizing garbage collection based solely on the amount of invalid data may introduce unnecessary inefficiencies. For example, when data stored in a particular memory region is being updated by a host system, performing garbage collection of that region may not be desirable as the host system may continue to invalidate data stored in the region.

Embodiments of the present invention are directed to garbage collection that takes into account the inactivity level of data stored in a memory region. Memory regions that have high invalidation activity or invalidation frequency may continue to have additional storage locations invalidated by host-initiated activity (or internal data storage system activity). Hence, it is advantageous to delay garbage collection of such memory regions until the host activity (and hence the data invalidation rate) subsides and the remaining stored data becomes relatively static, such that it and will not be invalidated any time soon. Relatively static data (e.g., data that has not been updated or invalidated for a particular period of time) is unlikely to be updated or changed by the host system, and can be garbage collected.

In some embodiments of the present invention, a data storage system can be configured to compute a set of scores associated with a set of memory regions. Each score can be based on duration since last invalidation of data stored in a corresponding region. The data storage system can perform garbage collection of at least one region based on the set of scores. In some embodiments of the present invention, a data storage system can be configured to identify a region suitable for garbage collection. In response to determining that a duration since last invalidation of data stored in the region exceeds a threshold, the data storage system can perform garbage collection of the region. The threshold can be adjusted due to various operational factors, such as number of regions that need to be freed, historical performance of garbage collection operation, and so on.

System Overview

FIG. 1A illustrates a combination 100A of a host system and a data storage system that implements garbage collection based on the inactivity level of stored data according to one embodiment of the invention. As is shown, the data storage system 120A (e.g., a hybrid disk drive) includes a controller 130, a non-volatile memory array 150, and magnetic storage 160, which comprises magnetic media 164. The non-volatile memory array 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The data storage system 120A can further comprise other types of storage.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., LBA) used to access the data storage system 120A. The controller 130 can execute the received commands in the non-volatile memory array 150, 160, etc.

Data storage system 120A can store data communicated by the host system 110. In other words, the data storage system 120A can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory array 150 and/or other storage modules. The controller 130 includes a garbage collection module 132 configured to perform garbage collection of data stored in the memory regions of the non-volatile memory array 150 and/or magnetic storage 160. A memory region can correspond to memory or data allocation unit, such as a block, zone, etc.

Figure 1B:
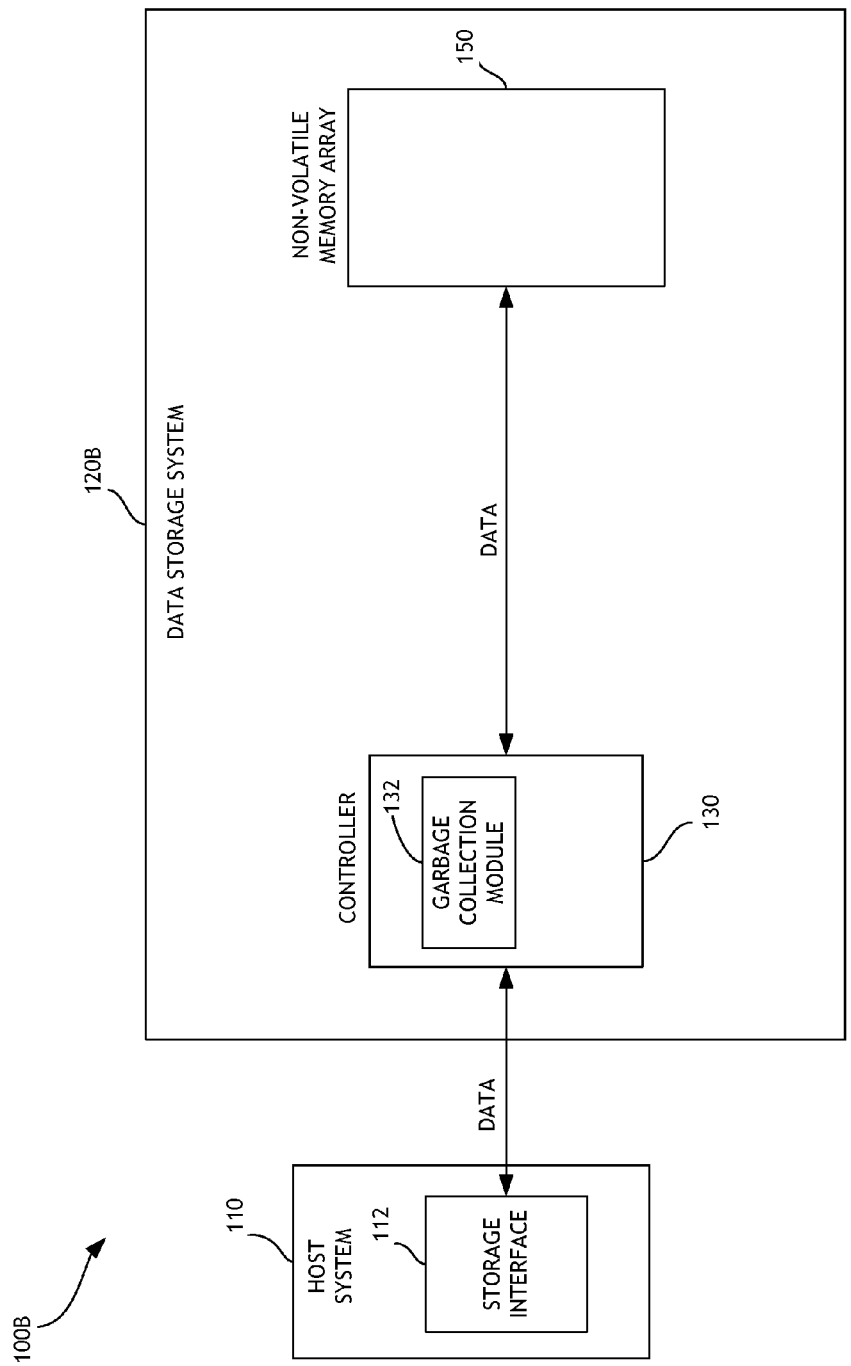
FIG. 1B illustrates a combination of a host system and a data storage system that implements garbage collection based on the inactivity level of stored data according to another embodiment of the invention.

FIG. 1B illustrates a combination 100B of a host system and a data storage system that implements garbage collection based on the inactivity level of stored data according to another embodiment of the invention. As is illustrated, data storage system 120B (e.g., solid-state drive) includes a controller 130 and non-volatile memory array 150. These and other components of the combination 100B are described above.

Figure 1C:
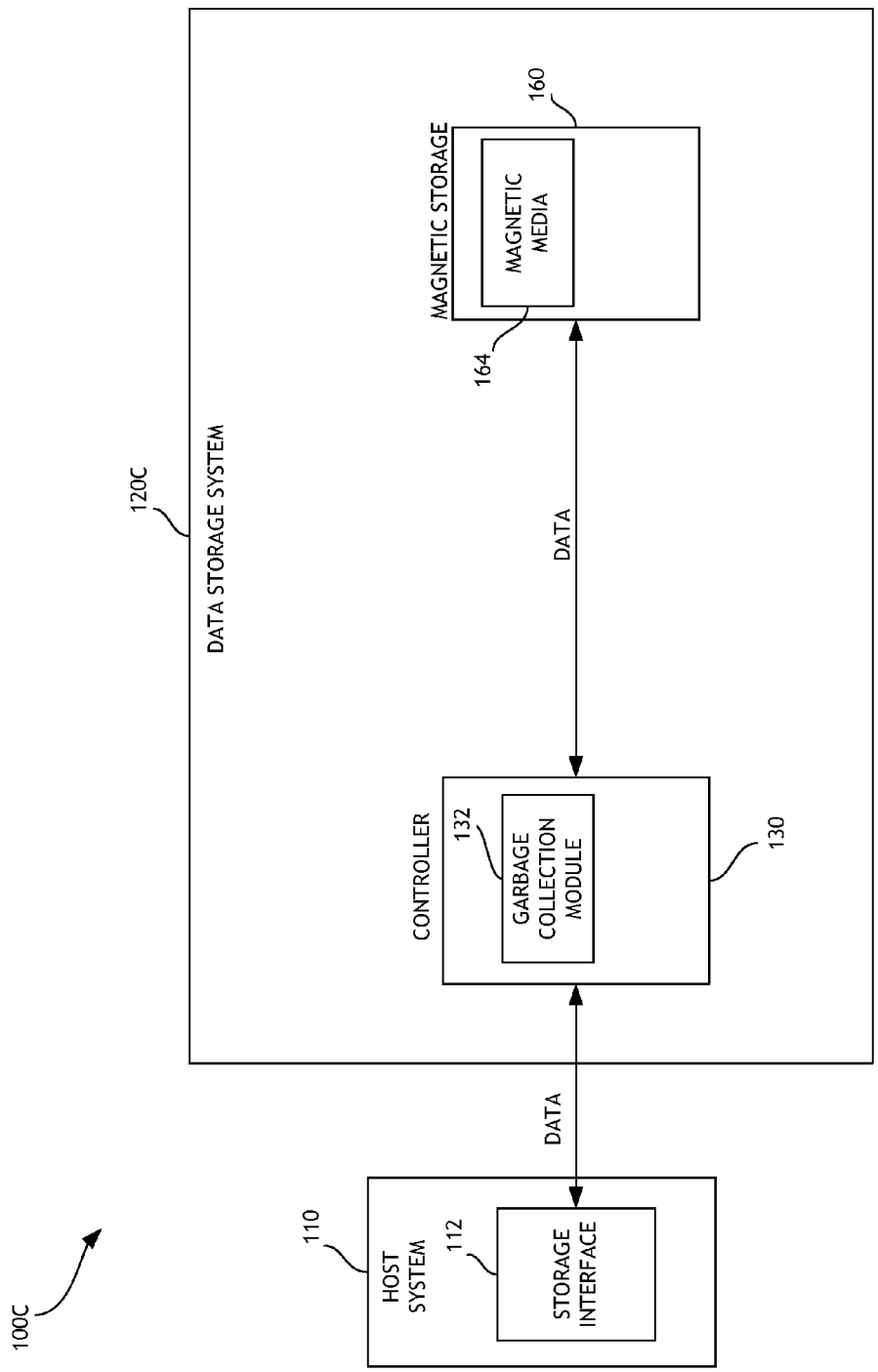
FIG. 1C illustrates a combination of a host system and a data storage system that implements garbage collection based on the inactivity level of stored data according to yet another embodiment of the invention.

FIG. 1C illustrates a combination 100C of a host system and a data storage system that implements garbage collection based on the inactivity level of stored data according to another embodiment of the invention. As is illustrated, data storage system 120C (e.g., shingled disk drive) includes a controller 130 and magnetic storage 160. These and other components of the combination 100C are described above.

Garbage Collection Based on Inactivity Level

Figure 2:
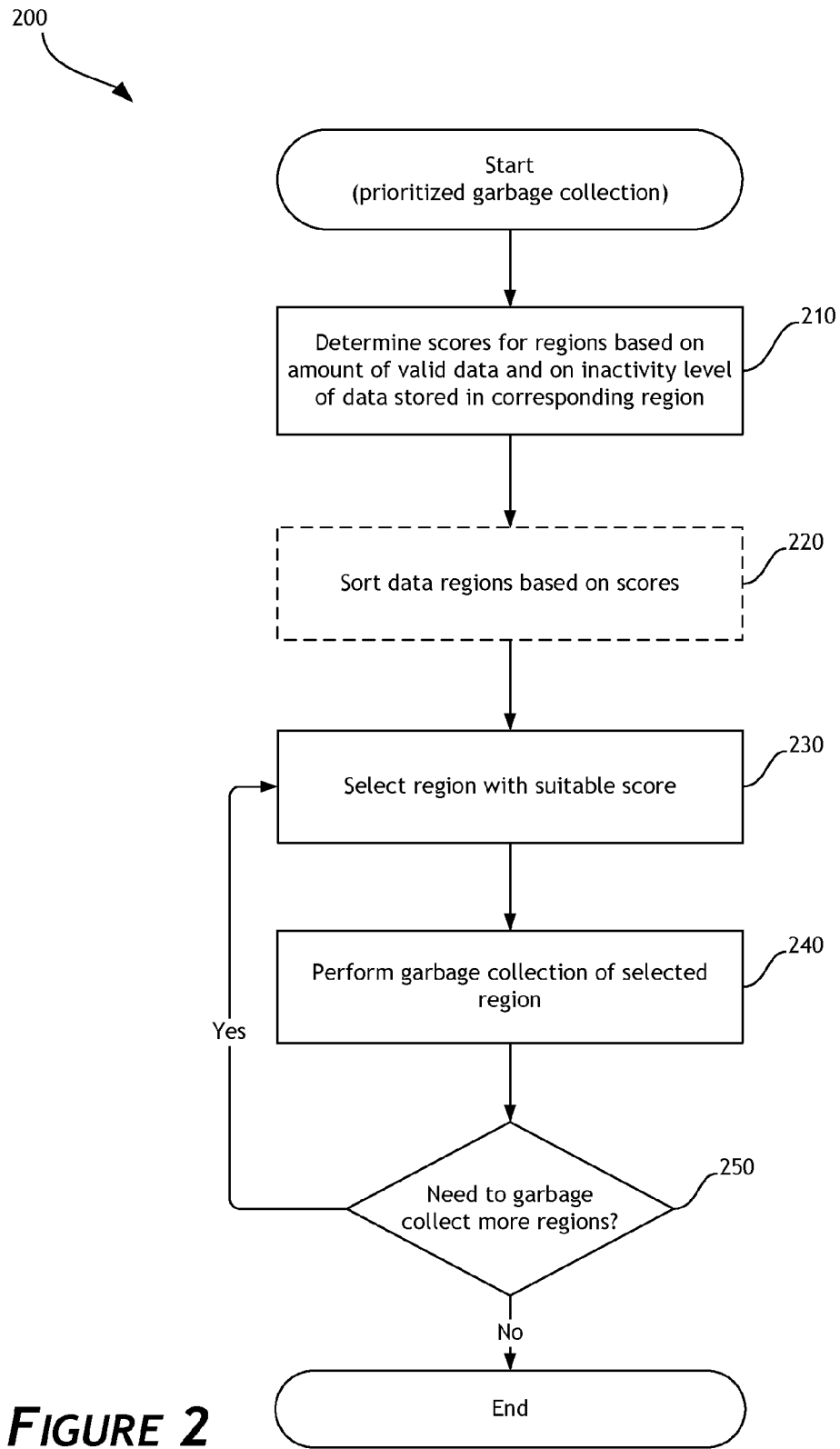
FIG. 2 is a flow diagram illustrating a process of performing garbage collection based on the inactivity level of stored data according to one embodiment of the invention.

FIG. 2 is a flow diagram illustrating a process 200 of performing garbage collection based on the inactivity level of stored data according to one embodiment of the invention. The process 200 can be executed by the controller 130 and/or the garbage collection module 132. The process 200 starts in block 210 where it determines or computes scores for the memory regions. Scores can be computed based on the amount of valid data stored in a region and on the inactivity level. In some embodiments, as is explained above, the data storage system 120A, 120B, and/or 120C can implement a logical interface through which data storage system's memory is presented to the host system 110 as a set of logical addresses. Internally, the controller 130 can map logical addresses to various physical locations or addresses in the non-volatile memory array 150 and/or other storage modules. When the host system updates (e.g., rewrites) data in a particular logical address, to maintain coherency of data, the data storage system can overwrite out-of-date data stored in a physical address corresponding to the logical address. However, in some embodiments it is more desirable to store the latest copy of data in a different physical address, associate the logical address with this logical address, and mark out-of-date data stored in the other physical address as invalid. Such invalid data becomes a candidate for being garbage collected so that the region can be freed.

The process 200 can determine the amount of invalid data stored in the memory regions. In addition, the process 200 can determine the inactivity level of data stored in the region. For example, the process 200 can keep track of duration since last time data stored in the region was updated (and hence invalidated). This can be accomplished using any number of suitable ways, such as for example maintaining timestamp(s), timer(s), counter(s), etc. In one embodiment, the process 200 can update the inactivity level based on invalidation of data stored in any given physical address or location or a number of physical addresses or locations in the region. In one embodiment, the process 200 can determine the score by using the following equation:

$$\text{score} = C_1 * \text{amount of invalid data} + C_2 * \text{duration since last invalidation}$$

where $C_1$ and $C_2$ are constants. Values of the constants can be selected to place more or less emphasis on the amount of invalid data or the inactivity level during garbage collection. In one embodiment, the process 200 can give more priority to regions that have higher inactivity levels. In another embodiment, the process 200 can give more priority to regions that have more invalid data. For example, if the data storage system is used to store relatively static data, such as operating system files, executable files, libraries (statically or dynamically linked), etc., it may be advantageous to give more priority to the amount of invalid data stored in the regions.

In one embodiment, values of the constants can be adjusted based on a historical performance of the garbage collection operation. For each region that was subjected to garbage collection, the data storage system (e.g., via the controller 130 and/or the garbage collection module 132) can track whether data stored in that region was relatively static. That is, the data storage system can determine whether data in the region was garbage collected at an appropriate time. For example, the data storage system can maintain a counter of "errors" corresponding to regions that were not appropriately garbage collected (e.g., regions comprised relatively dynamic or changing data). The data storage system can adjust the values of the constants when the counter exceeds an error threshold.

Figure 3:
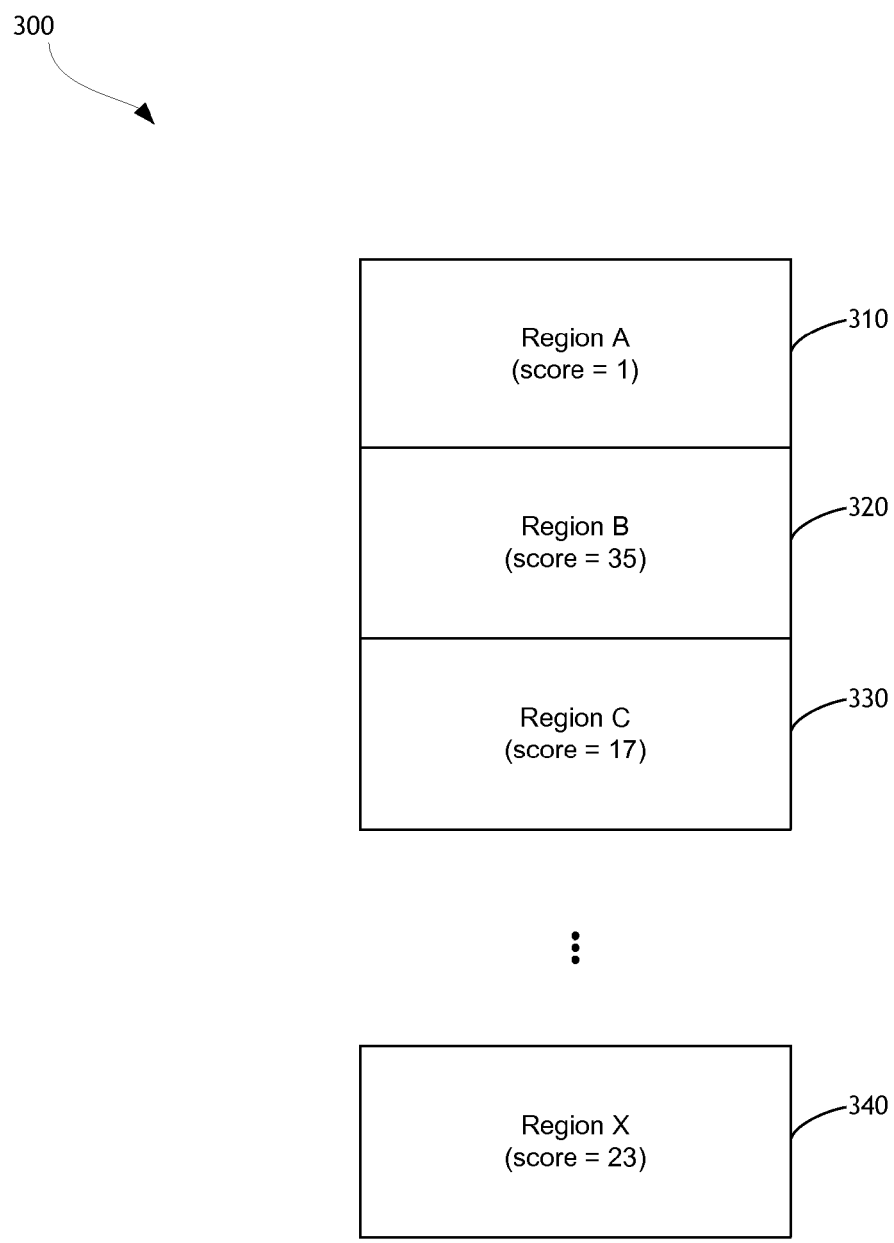
FIG. 3 illustrates memory regions scores in connection with the process of FIG. 2.

In block 220, the process can optionally sort regions using the scores. In block 230, the process 200 can select a region having a score suitable for garbage collection. In one embodiment, the process 200 can select regions for garbage collection based on the scores. For example, the process 200 can select for garbage collection one or more regions whose scores exceed a threshold. As another example, the process 200 can select for garbage collection one or more regions whose scores are below a threshold. As yet another example, the process 200 can select for garbage collection a region having the highest score (or the lowest score). This is illustrated in FIG. 3, which shows memory region scores 300. Region A (310) is determined to have a score of 1, region B (320) is determined to have a score of 35, region C (330) is determined to have a score of 17, and so on. Region X (340) is determined to have a score of 23. In one embodiment, the process 200 can select a region with the highest score for garbage collection. In other words, the process 200 can select region B (320).

In block 240, the process 200 can perform garbage collection of the selected region. In one embodiment, the process 200 can copy valid data stored in the selected region to another region. The selected region can then be used for storing data. In block 250, the process 200 can determine whether more regions need to be garbage collected (e.g., freed). If this is the case, the process can transition to block 230, where it can select another suitable region for garbage collection. If no more regions need to be garbage collected, the process 200 can terminate.

Figure 4:
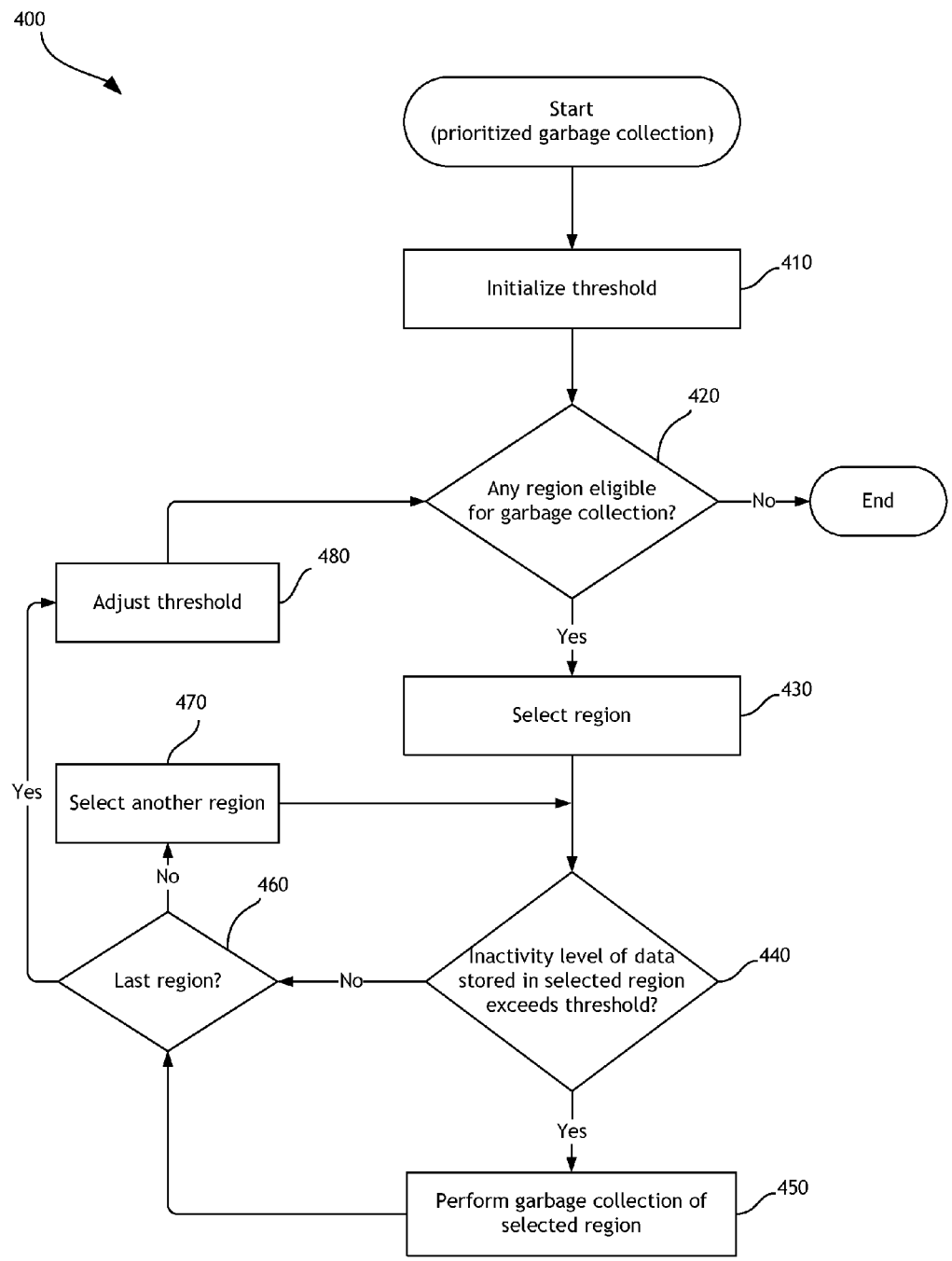
FIG. 4 is a flow diagram illustrating a process of performing garbage collection based on the inactivity level of stored data according to another embodiment of the invention.

FIG. 4 is a flow diagram illustrating a process 400 of performing garbage collection based on the inactivity level of stored data according to another embodiment of the invention. The process 400 can be executed by the controller 130 and/or the garbage collection module 132. The process 400 starts in block 410 where it initializes or selects the inactivity threshold. In block 420 the process determines whether there are any memory regions eligible for garbage collection. For example, the process 400 can determine whether one or more memory regions comprise invalid data. If there are no such regions, the process 400 can terminate. If such regions are identified, the process can transition to block 430, where it can select a region that is eligible for garbage collection. In one embodiment, the process 400 can select any region from the set of regions eligible for garbage collection. In another embodiment, the set of eligible regions can be sorted according to amount of invalid data in each region, and the process can select the region having the most invalid data. In block 440 the process 400 can compare the inactivity level of data stored in the selected region to the inactivity threshold. In one embodiment, as explained above, the process 400 can use the duration of time since last invalidation as an indication of the inactivity level. In one embodiment, the process 400 can determine whether the duration of time since last invalidation exceeds the threshold. In another embodiment, the process 400 can determine whether the duration of time since last invalidation is below than the threshold.

If the process 400 determines that the inactivity level of the selected region exceeds (or is below) the threshold, the process 400 can transition to block 450, where it can perform garbage collection of the selected region, and transition to block 460. If the process 400 determines in block 440 that the selected region is not eligible for garbage collection, the process can transition to block 460. In block 460, the process 400 can determine whether there are any other regions eligible for garbage collection (e.g., whether there are any other regions in the set regions identified in block 420). If there are such regions (or at least one such region), the process 400 can select another region in block 470 (e.g., select another region from set of regions identified in block 420). The process 400 can then transition to block 440.

If the process determines in block 460 that there are no other eligible regions, the process can transition to block 480, where it can adjust the inactivity threshold if further garbage collection is determined to be needed. For example, the process 400 can lower (or increase) the inactivity threshold in order to free more regions. After adjusting the threshold, the process 400 can transition to block 420. The process 400 can prioritize garbage collection based on the host activity. In other words, the process 400 can delay garbage collection (e.g., by initializing and adjusting the inactivity threshold) to allow the host system 110 to update data stored in the data storage system 120A, 120B, or 120C, such that relatively static data is garbage collected.

CONCLUSION

Embodiments of data storage systems disclosed herein are configured to efficiently perform garbage collection of stored data. In one embodiment, the inactivity level of data stored in regions of the data storage system is taken into account when prioritizing regions for garbage collection. Inactivity level of data stored in the memory regions can be compared to an inactivity threshold. The threshold can be adjusted during operation of the data storage system. Garbage collection can be delayed until data stored in a particular region becomes relatively static (e.g., data is unlikely to be updated). Write amplification associated with garbage collection is reduced, and improved performance is attained.

Other Variations

Those skilled in the art will appreciate that in some embodiments, garbage collection based on the inactivity level of stored data can take into account additional factors, such as the frequency or rate of invalidation of data stored in the regions, etc. In some embodiments, garbage collection based on the inactivity level of stored data can be implemented by any data storage system that uses logical to physical address indirection, such as shingled disk drive, solid state drive, hybrid disk drive, and so on. Additional system components can be utilized, and disclosed system components can be combined or omitted. The actual steps taken in the disclosed processes, such as the processes illustrated in FIGS. 2 and 4, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile data storage system, comprising:
   a data storage module comprising a plurality of regions for storing data; and
   a controller configured to:
   compute a set of scores associated with a set of regions of the plurality of regions, each score based at least in part on a duration since last invalidation of data stored in a corresponding region; and
   perform garbage collection of at least one region based at least partly on the set of scores, wherein garbage collection comprises copying valid data stored in the at least one region to another region.

2. The non-volatile data storage system of claim 1, wherein each score is further based at least in part on an amount of valid data stored in the corresponding region.

3. The non-volatile data storage system of claim 1, wherein the duration since last invalidation of data in a corresponding region corresponds at least in part to a rate of invalidating data stored in the region.

4. The non-volatile data storage system of claim 1, wherein data stored in the region is invalidated in response to a host system command.

5. The non-volatile data storage system of claim 4, wherein in response to receiving from the host system a write or program command associated with command data and a logical address corresponding to a first physical address in the data storage module, the controller is configured to invalidate data stored in the region by:
  storing the command data in a second physical address in the data storage module and associating the logical address with the second physical address, wherein the second physical address is different from the first physical address.

6. The non-volatile data storage system of claim 1, wherein the data storage module comprises a non-volatile memory array.

7. The non-volatile data storage system of claim 1, wherein the data storage module comprises shingled magnetic storage.

8. The non-volatile data storage system of claim 1, wherein the data storage module comprises a non-volatile memory array and magnetic storage.

9. In a non-volatile data storage system comprising a controller and a storage module that comprises a plurality of regions, a method of freeing at least some regions, the method comprising:
  computing a set of scores associated with a set of regions of the plurality of regions, each score based at least in part on a duration since last invalidation of data stored in a corresponding region; and
  performing garbage collection of at least one region based on the set of scores, wherein performing garbage collection comprises copying valid data stored in the at least one region to another region,
  wherein the method is performed under the control of the controller.

10. The method of claim 9, wherein each score is further based at least in part on an amount of valid data stored in the corresponding region.

11. The method of claim 9, wherein the duration since last invalidation of data in a corresponding region corresponds at least in part to a rate of invalidating data stored in the region.

12. The method of claim 9, wherein data stored in the region is invalidated in response to a host system command.

13. The method of claim 12, further comprising:
  in response to receiving from the host system a write or program command associated with command data and a logical address corresponding to a first physical address in the storage module, storing the command data in a second physical address in the storage module and associating the logical address with the second physical address,
  wherein the second physical address is different from the first physical address.

14. The method of claim 9, wherein the storage module comprises a non-volatile memory array.

15. The method of claim 9, wherein the storage module comprises shingled magnetic storage.

16. The method of claim 9, wherein the storage module comprises a non-volatile memory array and magnetic storage.

17. A non-volatile data storage system, comprising:
  a data storage module comprising a plurality of regions for storing data; and
  a controller configured to:
    identify a region suitable for garbage collection; and
    in response to determining that a duration since last invalidation of data stored in the region exceeds a threshold, perform garbage collection of the region, wherein garbage collection comprises copying valid data stored in the at least one region to another region.

18. The non-volatile data storage system of claim 17, wherein the controller is further configured to adjust the threshold based at least in part on a number of regions that need to be garbage collected.

19. The non-volatile data storage system of claim 17, wherein the controller is configured to identify a region suitable for garbage collection by determining whether at least some data stored in the region is invalid.

20. The non-volatile data storage system of claim 19, wherein data stored in the region is invalidated in response to a host system write or program command.

21. In a non-volatile data storage system comprising a controller and a storage module that comprises a plurality of regions, a method of freeing at least some regions, the method comprising:
  identifying a region suitable for being freed; and
  in response to determining that a duration since last invalidation of data stored in the region exceeds a threshold, performing garbage collection of the region,
  wherein garbage collection comprises copying valid data stored in the at least one region to another region, and
  wherein the method is performed under the control of the controller.

22. The method of claim 21, further comprising adjusting the threshold based at least in part on a number of regions that need to be freed.

23. The method of claim 21, wherein identifying a region suitable for garbage collection comprises determining whether at least some data stored in the region is invalid.

24. The method of claim 23, wherein data stored in the region is invalidated in response to a receiving a write or program command from a host system.

* * * * *